United States Patent [19]

Wendling et al.

[11] 4,306,954

[45] Dec. 22, 1981

[54] PROCESS FOR POLYMERIZING ACRYLIC SUBSTITUTED HYDANTOINS IN AIR

[75] Inventors: Larry A. Wendling; John B. Covington, both of Ramsey County, Minn.

[73] Assignee: Minnesota Mining and Manufacturing Company, St. Paul, Minn.

[21] Appl. No.: 51,888

[22] Filed: Jun. 25, 1979

[51] Int. Cl.³ ............................................. C08F 2/46
[52] U.S. Cl. .............................. 204/159.22; 427/44; 428/500; 428/522
[58] Field of Search .................................. 204/159.22

[56] References Cited

U.S. PATENT DOCUMENTS

| | | | |
|---|---|---|---|
| 3,808,226 | 4/1974 | Habermeier et al. | 204/159.22 |
| 3,821,098 | 6/1974 | Garratt et al. | 204/159.22 |
| 3,847,769 | 11/1974 | Garratt et al. | 204/159.22 |
| 3,852,302 | 12/1974 | Habermeier et al. | 204/159.22 |
| 3,960,824 | 6/1976 | Hicks | 204/159.22 |
| 4,071,477 | 1/1978 | Seltzer et al. | 204/159.22 |

*Primary Examiner*—Harold D. Anderson
*Attorney, Agent, or Firm*—Cruzan Alexander; Donald M. Sell; Mark A. Litman

[57] ABSTRACT

Acrylic substituted heterocyclic compounds have been found to be curable to a non-tacky state by radiation within the ultraviolet and visible regions of the electromagnetic spectrum.

19 Claims, No Drawings

PROCESS FOR POLYMERIZING ACRYLIC SUBSTITUTED HYDANTOINS IN AIR

FIELD OF THE INVENTION

The present invention relates to processes for polymerizing polyacrylate functional compositions and in particular to processes for the curing in air of certain polyacrylate functional materials by irradiation.

DESCRIPTION OF THE PRIOR ART

For many years it has been known that the polymerization of acrylate materials was sensitive to the presence of oxygen. It has been generally necessary for most acrylate polymerization processes to be performed in the absence or reduced presence of oxygen. Otherwise, the oxygen present in air will retard or even prevent polymerization of the acrylic composition so that desired levels of polymerization cannot be achieved. At best, only a tacky, incompletely polymerized resin or a weak, low molecular weight polyacrylate resin can be obtained.

Curable, oxygen insensitive acrylic compositions are described in U.S. Pat. Nos. 3,844,916, 3,914,165 and 3,925,349. These references teach that oxygen inhibition can be avoided by incorporation of a Michael adduct of a polyacrylate and an amine having at least one amino hydrogen into acrylic compositions. The use of such an adduct in acrylic photopolymerizable compositions requires the use of a relatively high concentration of polymerization photo-initiator (3% by weight is disclosed at Col. 3, lines 50-51 of U.S. Pat. No. 3,925,349). Although such compositions are useful for coatings and inks that can be cured in the presence of oxygen, these compositions are not satisfactory for coatings that are transparent and where discoloration is undesirable since the use of large amounts of photoinitiator leads to yellowing of the cured coating.

Acrylic compositions, containing 0.5 to 10 percent triphenyl phosphine, that can be cured rapidly in an atmosphere containing 300 to 1000 ppm of oxygen are disclosed in U.S. Pat. No. 4,113,893. Since the provision of an atmosphere containing oxygen in any concentration less than that found in air requires use of special equipment, the use of phosphines to obtain rapid curing is also unsatisfactory for many commercial processes.

U.S. Pat. No. 3,968,305 describes acrylic compositions comprising an aliphatic compound having three or more methacryloxy groups that can be polymerized to a crosslinked mar resistant coating. U.S. Pat. No. 4,014,771 teaches that by the addition of (1) 30 to 95 percent of the adduct of methacrylic acid and (2) either a polyglycidyl ether of an aromatic polyhydric compound or a polyglycidyl ester of an aromatic or aliphatic polycarboxylic acid to a polymethacryloyloxy compound such as that described in U.S. Pat. No. 3,968,305, there is obtained a composition which evidently can be polymerized without the necessity of excluding air during the polymerization.

Protective coatings produced by irradiation in the absence of air of the adduct of methacrylic acid to N-glycidylheterocyclic compounds are disclosed in U.S. Pat. Nos. 3,808,226 and 3,847,769.

U.S. Pat. No. 3,821,098 shows certain heterocyclic diacrylates and triacrylates included in the present invention to be polymerizable by irradiation. These are said to be advantageously polymerizable in the absence of oxygen, and all examples are performed in the presence of less than 0.2% oxygen atmospheres.

U.S. Pat. No. 3,808,226 shows certain heterocyclic diacrylates included within the description of the present invention which can be cured by irradiation. The only curing conditions shown are those within a metal mold in which the polymerizable mass fills the mold cavity, probably excluding any air.

SUMMARY OF THE PRESENT INVENTION

It has been found according to the present invention that heterocyclic polyacrylate materials and compositions can be cured by irradiation in the presence of oxygen, even at normal atmospheric levels, without essential modification of the compositions. Irradiation of these materials and compositions in the presence of at least two percent atmospheric oxygen with substantially complete cure to a solid non-tacky state is surprising for an acrylate material. The fact that these materials and compositions can be so cured in the presence of atmospheric levels of oxygen (~21%) is quite remarkable. These acrylates are generally characterized by containing at least one heterocyclic ring (Z) of the formula:

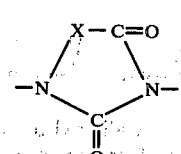

Wherein X is the divalent radical necessary to complete a 5- or 6-membered heterocyclic ring.

Attached to the at least two ring nitrogen atoms shown in Z are ethylenically unsaturated aliphatic groups, preferably with acryloyloxy or methacryloxyloxy unsaturation on the groups, although allyloxy and vinyl unsaturation is also useful.

DETAILED DESCRIPTION OF THE INVENTION

The heterocyclic polyacrylate materials useful in the practice of the process of the present inventions include both novel compounds and known compounds not heretofore known to be oxygen insensitive for radiation curing. The novel compounds useful in the present invention, disclosed and claimed in Applicant's copending application Ser. No. 51,876, filed June 25, 1979 entitled "Poly(Ethylenically Unsaturated Alkoxy) Heterocyclic Compounds" can be described by the formula:

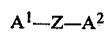

in which $A^1$ and $A^2$ independently are alkoxyalkyl groups having terminal ethylenic unsaturation and having the general formula:

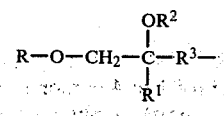

in which R—O— is a monovalent residue (formed by removal of the active hydrogen from an —OH group)

of an aliphatic terminally unsaturated primary alcohol, ROH, R having the formula:

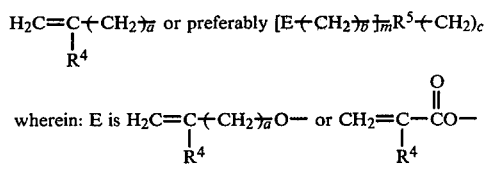

wherein: E is $H_2C=C(R^4)(CH_2)_aO-$ or $CH_2=C(R^4)-CO-$ a and c are independently an integer of 1 to 6,
b is zero or an integer of 1 to 6,
$R^1$ and $R^4$ are independently hydrogen or methyl,
$R^5$ is an aliphatic group having 1 to 15 carbon atoms (preferably alkylene of up to 15 carbon atoms) and optinally one to two catenary (i.e., backbone) oxygen atoms, or

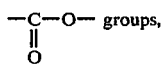

a valence of m+1, and
m is an integer of 1 to 5,
$R^2$ is preferably hydrogen but can be

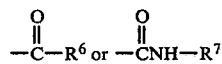

wherein $R^6$ is preferably alkenyl but can be alkyl (each preferably having 2 to 5 carbon atoms) and can be substituted by a phenyl or carboxyl group and $R^7$ is hydrogen, an aliphatic group (of up to eight carbon atoms, e.g., alkyl) or aromatic group (preferably having up to 8 carbon atoms and more preferably a phenyl group) and $R^7$ is most preferably an acryloyloxyalkyl or a methacryloyloxyalkyl group, $R^3$ is an alkylene group having 1 to 6 carbon atoms and optionally one catenary oxygen atom; and z is a heterocyclic group of the formula:

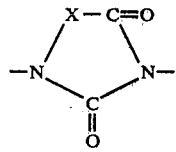

wherein:
X is a divalent group which is required to complete a 5- or 6-membered heterocyclic ring, preferably X is

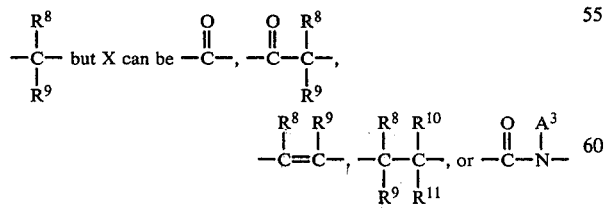

wherein $R^8$, $R^9$, $R^{10}$, and $R^{11}$ are independently hydrogen or lower alkyl (of 1 to 4 carbon atoms), cycloalkyl (of 3 to 6 carbon atoms) or phenyl group (of 6 to 12 carbon atoms) and $A^3$ is an alkoxyalkyl group as defined above for $A^1$ and $A^2$, and $A^1$, $A^2$, and $A^3$ are independently preferably (polyacryloyloxy)alkoxy propyl groups of the formula

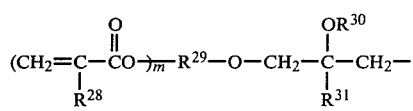

where $R^{28}$ is hydrogen or methyl, $R^{29}$ is the residue of an aliphatic polyol having (m+1) primary hydroxyl groups and containing 1 to 10 carbon atoms (and optionally a catenary oxygen), preferably 1 to 2 quaternary carbon atoms, and a valence of m+1, the residue forming by removal of m+1 hydroxy groups, $R^{30}$ is hydrogen

wherein $R^6$ and $R^7$ are independently as defined above, and
$R^{31}$ is hydrogen or methyl.

The preferred compounds of Formula I are those wherein E is

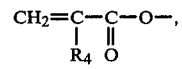

m is 2 to 5, and X is

The prior art compounds not heretofore used in an air cure irradiation polymerization process can be represented by the formula given in U.S. Pat. No. 3,821,098:

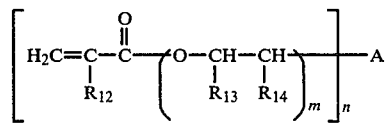

wherein $R_{12}$ and $R_{13}$ each independently represent a hydrogen atom or the methyl group, $R_{14}$ stands for a hydrogen atom, an alkyl group, an alkyl group interrupted by oxygen atoms, or a phenyl group; or wherein $R_{13}$ and $R_{14}$ together represent a trimethylene or tetramethylene group, m stands for a whole number from 1 to 30, preferably from 1 to 4, n denotes the number 2 or 3, and A represents an organic radical containing at least once the grouping:

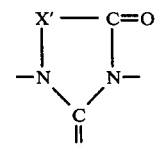

wherein X' represents a divalent radical which is necessary for the completion of a five-or six-membered, unsubstituted or substituted, heterocyclic ring.

The radical X' in the N-heterocyclic grouping of formula I can be, e.g. a radical of the formulae:

$$\overset{|}{C}=O; \quad \overset{|}{C}\diagdown_{R^{16}}^{R^{15}}; \quad \overset{|}{C}\diagup_{C}^{C=O}\diagdown_{R^{16}}^{R^{15}}; \quad \overset{|}{C}\diagup_{C-R^{16'}}^{C-R^{15}}; \quad \overset{|}{C}\diagup_{C}^{R^{15}}\diagdown_{R^{16}}^{R^{16}}; \quad \overset{|}{C}\diagdown_{R^{18}}^{R^{17}}; \quad \text{or } O=\overset{|}{C}\diagdown_{N-}^{N-}$$

wherein $R^{15}$, $R^{16}$, $R^{17}$ and $R^{18}$ can each independently represent a hydrogen atom or an alkyl group, preferably a lower alkyl group having 1–4 carbon atoms, an alkenyl group, preferably a lower alkylene group having 1–4 carbon atoms, a cycloalkyl group (preferably of 3 to 8 carbon atoms), or an unsubstituted or substituted phenyl group. The valence of the nitrogen atom on the last group may be satisfied by hydrogen, aliphatic, or aromatic groups $R^{19}$, preferably of no more than eight carbon atoms. The aliphatic groups may be alkyl groups for example, and the cromatic group may be phenyl or alkylphenyl or phenylalkyl groups, for example.

The materials useful in the process of the present invention also include those of the following formula from U.S. Pat. No. 3,808,266:

$$\left[ CH_2=\underset{R^{20}}{\overset{\overset{O}{\parallel}}{C}}-C-O-CH_2-\underset{R^{21}}{\overset{OH}{C}}-CH_2 \right]_n A$$

wherein $R^{20}$ is hydrogen or methyl, $R^{21}$ is hydrogen or methyl, n is 2 or 3, and A is as defined above for the materials of U.S. Pat. No. 3,821,098.

In its broadest scope, the materials of the present invention can be represented by the formula
$$A^4\text{—}Z\text{—}A^5$$
wherein $A^4$ and $A^5$ are groups having the formula $$\left[ CH_2=\underset{R^{22}}{\overset{\overset{O}{\parallel}}{C}}-C+OCH_2\overset{}{\overset{}{)_e}} \right]_f (R^{23}CH_2\overset{}{)_g}+OCH_2-\underset{R^{25}}{\overset{R^{24}}{C}})_h + R^{26})_i$$

wherein $R^{22}$ and $R^{25}$ are independently hydrogen or methyl, $R^{23}$ is an aliphatic group of 1 to 15 carbon atoms (preferably alkylene group of 1 to 15 carbon atoms) which may have up to 2 non-adjacent catenary oxygen atoms or $$-\overset{\overset{O}{\parallel}}{C}-O-\text{ groups,}$$

$R^{24}$ is selected from hydrogen or —$OR^{27}$ in which $R^{27}$ is selected from hydrogen, $$-\overset{\overset{O}{\parallel}}{C}-R^6, \text{ and } -\overset{\overset{O}{\parallel}}{C}-NH-R^7$$

with $R^6$ and $R^7$ as defined above.

$R^{26}$ is an alkylene group of from 1 to 6 carbon atoms and optionally 1 catenary oxygen atom, e and g are independently 0 or 1, f is an integer of from 1 to 5, h is an integer of from 1 to 30 (and preferably 1 to 12), and i is either zero or 1, and Z is as defined above.

It is preferred that when $R^{24}$ is hydrogen, then e and g are both zero, and f and i are one; and when $R^3$ is —$OR^{27}$ at least one of e and g are zero and f is one, or e and g are 1 and f is 1 to 5.

Wherever the term "group" is used in the definition of a term (as in alkyl group versus alkyl), the term connotes the possibility of substitution recognized by the act as not affecting the functional nature of the chemical term. With backbone chains, for example, $-(CH_2\text{)}_n O-CH_2)_m$ is recognized as being substantially equivalent to $-(CH_2)_{m+n}$ and included within the term "alkyl group". In the same manner, terminal groups of the formula $-(CH_2)_{m+n}CH_3$ are recognized as substantially equivalent to $-(CH_2)_m O-CH_2-_{m+1}Q$ wherein group Q represents moieties substituting for a terminal hydrogen. For example, insofar as the functionality of the compound as a whole is concerned, Q might be halogen, amino, nitro, etc., without effecting the functional ability of the compound. This is readily understood by the ordinarly skilled artisan.

The process of the present invention comprises the curing of these materials or the curing of compositions comprising at least 15% by weight of these materials by exposure to electromagnetic radiation or electron beam radiation in an atmosphere containing at least 2% oxygen. Compositions used in the practice of the present invention preferably comprise at least 30 to 10% by weight of these heterocyclic polyacrylate materials and more preferably comprise from 45 to 85% by weight of these heterocyclic polyacrylate materials. The percent by weight is based upon polymerizable components and does not include essentially inert fillers.

The compositions used in the process of the present invention may be diluted with up to 85% by weight of any ethylenically unsaturated monomer. Preferably the majority of comonomers are at least diethylenically unsaturated monomers. Generic classes include the acrylates, methacrylates, acrylic anhydrides, ethylenically unsaturated anhydrides, olefinic comounds, acrylamides, ethylenically unsaturated amides and urethanes, vinyl esters, vinyl ethers, vinyl halides, vinyl epoxy resins, vinyl silanes and siloxanes, vinyl heterocycles, and prepolymers and polymers these materials. Particularly suitable ethylenically unsaturated monomers include methyl methacrylate, ethyl acrylate, 2-ethylhexyl acrylate, cyclohexyl acrylate, styrene, butadiene, 2-chlorostyrene, 2,4-dichlorostyrene, acrylic acid, acrylamide, acrylonitrile, t-butyl acrylate, methyl acrylate, butyl acrylate, N-vinyl pyrrolidone, 2-(N-butylcarbamyl)ethyl methacrylate and 2-(N-butylcarbamyl)ethyl methacrylate and 2-(N-ethylcarbamyl)ethyl methacrylate. Preferably 35 to 80% and most preferably 45 to 60% by weight of copolymerizable components comprise the heterocyclic agents of the present invention. Other diluting monomers that can be incorporated into the composition of the invention include 1,4-butylene dimethacrylate or acrylate, ethylene dimethacrylate, hexamethylene diacrylate or dimethacrylate, glyceryl diacrylate or methacrylate, glyceryl triacrylate or trimethacrylate, pentaerythritol triacrylate or trimethacrylate, pentaerythritol tetraacrylate or tetramethacrylate, diallyl phthalate, dipentaerythritol pentaacrylate, neopentylglycol triacrylate and 1,3,5-tri(2-methacryloxyethyl)-s-triazine.

Polymerization initiators suitable for use in the comopsitions of the invention are compounds which liberate or generate a free-radical on addition of energy. Such initiators include peroxy, azo, and redox systems each of which are well known and are described frequently in polymerization art, e.g. Chapter II of *Photochemistry*, by Calvert and Pitts, John Wiley & Sons (1966). Included among free-radical catalysts are the conventional heat activated catalysts such as organic peroxides and organic hydroperoxides; examples are benzoyl peroxide, tertiary-butyl perbenzoate, cumene hydroperoxide, azobis (isobutyronitrile) and the like. The preferred initiators are photopolymerization initiators which facilitate polymerization when the composition is irradiated. Included among such initiators are acyloin and derivatives thereof, such as benzoin, benzoin methyl ether, benzoin ethyl ether, benzoin isopropyl ether, benzoin isobutyl ether, and α-methylbenzoin; diketones such as benzil and diacetyl, etc.; organic sulfides such as diphenyl monosulfide, diphenyl disulfide, decyl phenyl sulfide, and tetramethylthiuram monosulfide; S-acyl dithiocarbamates, such as S-benzoyl-N,N-dimethyldithiocarbamate; phenones such as acetophenone, α, α, α-tribromacetophenone, α, α-diethoxyacetophenone, 2,2-dimethoxy-2-phenylacetophenone, o-nitro-α, α, α-tribomacetophenone benzophenone, and p,p'-tetramethyldiaminobenzophenone; aromatic iodonium and aromatic sulfonium salts; sulfonyl halides such as p-toluenesulfonyl chloride 1-naphthalenesulfonyl chloride, 2-naphthalenesulfonyl chloride, 1-3benzenedisulfonyl chloride, 2,4-dinitrobenzenesulfonyl bromide and p-acetamidobenzenesulfonyl chloride. Normally the initiator is used in amounts ranging from about 0.01 to 5% by weight of the total polymerizable composition. When the quantity is less than 0.01% by weight, the polymerization rate becomes extremely low. If the initiator is used in excess of 5% by weight, no correspondingly improved effect can be expected. Thus, addition of such greater quantity is economically unjustified. Preferably, about 0.25 to 1.0% of initiator is used in the polymerizable compositions.

The compositions used in the process of the present invention can also contain a viscosity modifier or binder. Generally, up to about 50 percent by weight of a compatible polymer is used. Preferably, the polymer is an acrylic polymer such as poly(acrylic acid), a poly(methacrylic acid), poly(methyl methacrylate), poly(vinyl chloride), poly(vinyl acetate), poly(vinyl butyral) and the like. Other polymers include polyethers, polyesters, polylactones, polyamides, polyurethanes, cellulose derivatives, polysiloxanes and the like.

The compositions used in preparing coating of the invention can also include a variety of addenda utilized for their known purpose, such as stabilizers, inhibitors, lubricants, flexibilizers, pigments, carbon black, dyes, reinforcing fillers such as finely divided silica, non-reinforcing fillers such as diatomaceous earth, metal oxides, asbestos, fiberglass, glass bubbles, talc, etc. Fillers can generally be used in proportions up to about 200 percent by weight of the curable components but preferably are used up to about 50 percent by weight. Where the polymerizing energy is radiation, it is desirable that the addenda be transparent to the radiation.

The compositions used in preparing coatings of the invention are prepared by simply mixing (under "safe light" conditions if the composition is to be sensitized to visible light) the polymerization initiator and sensitizer (where used), the heterocyclic polyacrylate materials, diluting monomers, binders and addenda. Inert solvents may be employed if desired when effecting this mixture. Examples of suitable solvents are methanol, ethanol, acetone, acetonitrile and includes any solvent which does not react with the components of the mixture.

The compositions may be applied to the substrates before curing in any conventional fashion. Roller coating, spray coating, knife-edge coating, dip-coating, sputter coating, bar coating and any other conventional process for the application of liquids to substrates may be used.

Substrates

The coatings of the present invention find application useful on substantially any solid substrate. Because the coatings of the present invention can be cured by radiation, even highly temperature sensitive substrates can be coated. The substrates may be in substantially any form, such as sheets, films, fibers, fabrics and shaped solid objects. Amongst the substrates particularly finding advantages with coating of the present invention are polymeric resins, including both thermoplastic and thermoset resins (e.g. polyesters, polyethers, polyamides, polyurethanes, polycarbonates, polyacrylates, polyolefins, polyvinyls, cellulosesters, epoxy resins, polysiloxanes, etc.), ceramic substrates, including glass, fused ceramic sheeting, and fibers, metals and metalized surfaces, natural cellulosic materials, including wood and paper, natural resins, including rubber and gelatin and other various solid surfaces.

Where the coating compositions used in the process of this invention are not naturally adherent to the particular substrate selected, primer compositions, comprising single ingredients or blends of materials, may be used to improve the bond of the coating to the substrate. Texturizing, chemical or physical treatment of the surface may also be used to improve bonding.

Particularly useful substrates for application of the coatings of the present invention would be those requiring transparent protective coatings. Finished photographic prints and films, paintings, transparencies, car windshields, painted surfaces, instant film (i.e., film which does not require external application of developing chemistry), photothermographic and thermographic paper and film, photoconductive substrates, opthalmic lenses, motion picture film, street and traffic signs, reflective surfaces, retroreflective surfaces, traffic lights, and many other substrates are usefully coated according to the practice of the present invention.

Where the polymerization catalyst is a photoinitiator, the composition can be a composition for in situ curing because of this insensitivity to oxygen.

The photopolymerizable compositions with at least three acrylate functionalities are particularly suitable for applications in the field of protective coatings and graphic arts because of their superior abrasion-resistance and adhesion to many rigid, resilient and flexible substrates such as metals, metal oxides, plastics, rubber, glass, paper, wood and ceramics; their excellent resistance to most solvents and chemicals; their excellent flexibility and weatherability; and their capability for forming high resolution images.

Curing

The photopolymerization of the compositions of the invention occurs on exposure of the compositions to any source of radiation emitting actinic radiation at a wavelength within the ultraviolet and visible spectral regions. Suitable sources of radiation include mercury, xenon, carbon arc and tungsten filament lamps, sunlight, etc. Exposures may be from less than about 1 second to 10 minutes or more depending upon the amounts of the particular polymerizable materials and photopolymerization catalyst being utilized and depending upon the radiation source, distance from the source, and the thickness of the coating to be cured. The compositions may also be polymerized by exposure to electron beam irradiation. Generally speaking, the dosage necessary is from less than 1 megarad to 100 megarad or more. One of the major advantages with using electron beam curing is that highly pigmented compositions can be effectively cured at a faster rate than by mere exposure to actinic radiation.

EXAMPLE 1

Mixtures of compounds 1–6 (of Table 1) and 2% by weight of an appropriate photoinitiator were coated onto 12 μm polyester and dried to provide a 2.5 μm layer. For Compounds 1 through 5, 2,2-dimethoxy-2-phenylacetophenone was used as a photoinitiator; for compound 6 benzophenone was used as a photoinitiator, as specified in U.S. Pat. No. 3,925,349. The layers were then cured in a UV Processor, Model No. CC 1202 N/A (manufactured by Radiation Polymer Co.). An 80 watt/cm (200 watts/inch) medium pressure mercury arc lamp was used as the radiation source. A film was considered cured when it displayed mar resistance after treatment with ethanol. All films were cured in one pass at a given belt speed unless indicated otherwise.

The data in Table 1 show that the cure rates in air for compounds 1–3 of this invention are slower only by a factor of from 0.45–0.90 than the corresponding cure rates under a nitrogen atmosphere. This is in marked contrast to the cure rates in air of acrylates 4 and 5 which are slower than their corresponding cure rates under a nitrogen atmosphere by at least a factor of 0.006.

Compound 6 is described in U.S. Pat. No. 3,925,349 as photocurable in the presence of air. A film of this material cures at similar rates in the presence or absence of oxygen, but fails to display good mar resistance.

EXAMPLE 2

A solution containing 2.3 g of compound 1 from Example 1, 2.3 g acetone, and 0.033 g diethoxyacetophenone was coated onto a 12 m polyethylene sheet with a #14 Meyer bar. The layer was dried and placed in a mounting for a Perkin Elmer Model No. 257 infrared spectrophotometer. The absorbances at 1630 cm$^{-1}$ and 810 cm$^{-1}$, characteristic of acrylate unsaturation, were recorded. The mounting was removed from the spectrophotometer and passed through a UV processor as described in Example 1 at 50 ft/min. The mounting was returned to the spectrophotometer and the absorbances at 1630 cm$^{-1}$ and 810 cm$^{-1}$ were recorded and compared to the initial absorbances. This experiment showed that 70–80% of the acrylate functionality was consumed under the curing conditions. Five additional passes of this film at 50 ft/min in the UV processor failed to show any significant decrease in the acrylate infrared absorbances.

The same experiment was repeated, except that the film was cured under nitrogen atmosphere. Once again 70–80% of the acrylate functionality was consumed in one pass at 50 ft/min with no additional crosslinking being observed with additional curing time.

The experiments described above indicate that under these curing conditions there is no observable difference in the degree of crosslinking for Compound 1, Example 1, in the presence or absence of atmospheric oxygen.

EXAMPLES 3–8

Various amounts of Compounds 1 and 2 (from Example 1) with trimethylolpropanetriacrylate (TMPTA) and 2% by weight of 2,2-dimethoxy-2-phenyl acetophenone was added. Each mixture was diluted with an equal weight of acetone and coated onto 12 μm polyester film and dried. The dried coating was 2.5 μm thick. The film was exposed in air at a distance of 6 cm to the radiation from a 100 watt Hanovia 3D690 lamp, and the time was measured at which each became insoluble in acetone. The data obtained is recorded in Table 2.

TABLE 2

| Exp. No. | Composition | | Cure Time (Sec.) |
|---|---|---|---|
| | Compound (%) | TMPTA | |
| 3 | None | 100 | 600 |
| 4 | A (17) | 83 | 80 |
| 5 | A (28) | 72 | 60 |
| 6 | A (50) | 50 | 50 |
| 7 | A (100) | 0 | 10 |
| 8 | B (100) | 0 | 30 |

By reference to Table 2 it can be seen that TMPTA requires 10 minutes to reach insolubility and that with the addition of 17% of Compound 1 (from Example 1) the cure time is reduced to 80 seconds and with increasing amounts of 1, the composition cures faster until at 100% 1, the composition under the stated conditions cures in only 10 seconds. Comparable results can be obrtained with Compound 2.

EXAMPLE 9

One part polyacrylic acid, one part compound 1 from Example 1, five parts water, five parts ethanol and 0.02 parts of 2,2-dimethoxy-2-phenyl-acetophenone were mixed together to form a solution. A layer 5.0 μm in thickness of this solution was coated onto 12 μm polyester as described in Example 1. A patterned template was placed over the layer and exposed by a Hanovia 3D690 mercury arc lamp in air at a distance of 6 cm for two minutes. The exposed sheet was developed with cold water leaving an image having excellent resolution.

EXAMPLES 9–16

Coatings about 5 μm thick were prepared by coating using a #20 Meyer bar onto about 12 μm polyethylene film primed with polyvinylidene chloride 50% solutions in ethyl acetate (other solvents such as ketones and lower alcohols are equally suitable) and drying mixtures of Compound 1 of Example 1, zero to 100% of Compound 2 of Example 1, and pentaerythritol triacrylate (PTA) based on total weight of Compounds 1, 2 and PTA. To each solution had been added, as photoinitiator, 1% of Irgacure 651 (similar results were obtained with α, α-diethoxyacetophenone and benzoin ethyl ether and, as coating aid, 0.01% of a fluorocarbon or silicone surfactant. The dried coatings were then cured by one pass in a Model 1202 AN (PPG) Ultraviolet Processor (manufactured by Radiation Polymer Company) operated at about 12 m/min with an 80 watt/cm medium pressure mercury vapor lamp 15 cm from the surface of the layer without exclusion of air. The cured layer was tested for cross-hatch adhesion, Taber wheel abrasion, resistance to steel wool, and falling sand abrasion. The results are recorded in Table 3.

TABLE 3

| Exp. No. | % 1 | % PTA | % 2 | Cross-Hatch Adhesion % | Abrasion Resistance | | |
|---|---|---|---|---|---|---|---|
| | | | | | Taber % Haze | Falling Sand % Haze | Steel Wool |
| 9 | 75 | 25 | 0 | 100 | 2-7 | 13-16 | Excellent |
| 10 | 67.5 | 22.5 | 10 | 100 | 2-7 | 13-16 | " |
| 11 | 60 | 20 | 20 | 100 | 2-7 | 13-16 | " |
| 12 | 52.5 | 17.5 | 30 | 100 | 5-9 | " | " |
| 13 | 45 | 15 | 40 | 100 | 5-9 | " | " |
| 14 | 37.5 | 12.5 | 50 | 100 | 5-9 | " | " |
| 15 | 30 | 10 | 60 | 100 | 28-34 | | Fair |
| 6 | 0 | 0 | 100 | | | | |

Table 3 shows that coatings prepared from the hexaacryloyloxyhydantoin, Compound 1, and up to more than 50% of the diacryloyloxyhydantoin, Compound 2, have excellent resistance to abrasion as measured by Taber, falling sand and steel wool procedures. At up to about 30% Compound 2, abrasion resistance is superior. When coatings were prepared as for Examples 3-10 but using photoinitiator concentrations from 0.4 to 3% and tested, similar abrasion resistance and cross-hatch adhesion was obtained.

EXAMPLE 16

Into a 250 ml three-necked round bottom flask equipped with mechanical stirrer, pressure equalizing dropping funnel, reflux condenser, and calcium sulfate drying tube were changed 103.0 g pentaerythritol triacrylate (hydroxy equivalent weight of 515), 23.2 g 2-hydroxyethyl acrylate (0.2 m), 0.08 g 4-methoxyphenol, and 1.0 g borontrifluoride etherate. The reaction flask was heated to 75° C. and 55.2 g (0.40 m epoxy equivalency) 1,3-bis(2,3-epoxypropyl)-5,5-dimethyl-2,4-imidizolidinedione in 20 ml chloroform was added dropwise over one hour. After the addition, the reaction flask temperature was raised to 88° C. and stirred for 18.0 hours. At this time, titration of an aliquote for unreacted epoxide indicated the reaction was greater than 99% complete. The volatiles were removed by vacuum distillation leaving a viscous liquid which contains a mixture of bis(triacryloyl)-,bis(monoacryloyl)-, and the unsymmetrical monoacryloyl-triacryloyl-imidizolidinedione, and impurities, introduced with the pentaerythritol triacrylate.

A layer of the reaction product of Example 15, prepared to contain 2% Iragacure 651 and cured in air as described for compounds of Example 1, had abrasion and chemical resistance characteristics similar to those of the layers of Example 1.

TABLE 1

COMPARATIVE PHOTOCURE STUDIES

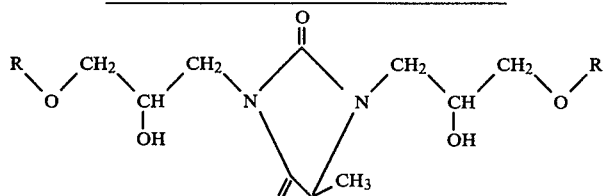

| COMPOUND | CURE RATE (ft/min)[a] | | RELATIVE CURE TIMES | |
|---|---|---|---|---|
| | Air | $N_2$ | Air | $N_2$ |
| 1; R is $-CH_2C(CH_2OCOCH=CH_2)_3$ | 90 | 200 | 9 | 20 |
| 2; R is $-CH_2CH_2OCOCH=CH_2$ | 60 | 67 | 6 | 6.7 |
| 3; R is $-COCH=CH_2$ | 40 | 60 | 4 | 6 |
| 4; hexanedioldiacrylate | No cure | 300 | — | 300 |
| 5; Trimethylolpropane-triacrylate | 18 Passes @ 40 | 350 | 0.22 | 35 |
| 6; 1:1 Michael adduct of trimethylolpropane-triacrylate and diethylamine | (5 Passes @ 50)[b] | (5 Passes @ 50)[b] | (1)[b] | (1)[b] |

[a]All compounds were cured in one pass at the given belt speed unless otherwise indicated.
[b]This material cured to a non-tacky surface but failed to display the mar resistance of Compounds 1-5.

We claim:
1. The process of curing a composition to a non-tacky state comprising at least 15% by weight of radiation polymerizable components having the formula

$$A^1-Z-A^2 \qquad (1)$$

wherein $A^1$ and $A^2$ independently are ethylenically unsaturated terminal groups having terminal ethylenic unsaturation and having the formula

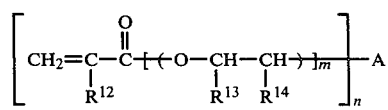

wherein R—O— is a monovalent residue of an aliphatic terminally unsaturated primary alcohol, ROH, formed by the removal of the active hydrogen from the primary —OH group, R having the formula:

wherein E is

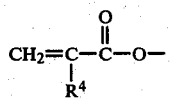

c is an integer of from 1 to 6,
b is zero or an integer of from 1 to 6,
$R^1$ and $R^4$ independently represent hydrogen or methyl,
$R^5$ is an aliphatic group having from 1 to 15 carbon atoms, and no more than two catenary oxygen or carboxy groups, a valence of m+1,
n is an integer of from 1 to 5,
$R^2$ represents hydrogen or groups of the formula

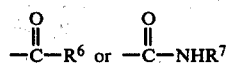

wherein $R^6$ represents alkyl or alkenyl groups
$R^7$ is an aliphatic or aromatic group of up to eight carbon atoms,
$R^3$ is an alkylene group of from 1 to 6 carbon atoms with up to one catenary oxygen atom, and
Z is a heterocyclic group of the formula

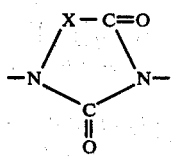

wherein X is a divalent group which is required to complete a 5- or 6-membered heterocyclic ring, or

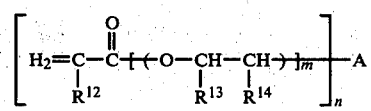

wherein $R^{12}$ and $R^{13}$ independently represent hydrogen or methyl,
$R^{14}$ represents hydrogen, an alkyl group, or a phenyl group,
$R^{13}$ and $R^{14}$ together may represent a trimethylene or tetramethylene group,
m represents a number of from 1 to 30,
n is 2 or 3, and
A represents a group of the formula

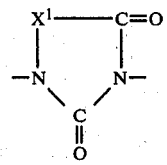

wherein $X^1$ represents the divalent radical necessary to complete a 5- or 6-membered heterocyclic ring group, said process comprising exposing said composition to radiation within the ultraviolet and visible spectral region while the composition is in the presence of an atmosphere of at least 2% by volume of oxygen to polymerize said components having formula (1) or (2).

2. The process of claim 1 wherein said at least 15% by weight of polymerizable components are compounds of formula (2), m is from 1 to 4, and $X^1$ is selected from the group consisting of

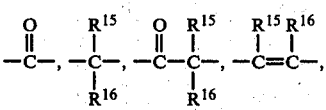

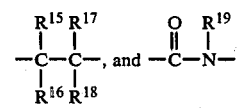

wherein $R^{15}$, $R^{16}$, $R^{17}$, and $R^{18}$ independently represent hydrogen, an alkyl group, an alkylene group, a cycloalkyl group, or a phenyl group, and
$R^{19}$ represents hydrogen, an aliphatic group, or an aromatic group.

3. The process of claim 2 wherein $R^{15}$, $R^{16}$, $R^{17}$ and $R^{18}$ are hydrogen, alkyl of 1 to 4 carbon atoms, alkylene of 1 to 4 carbon atoms, or phenyl, and $X^1$ is

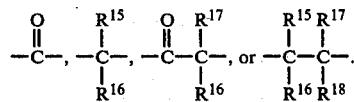

4. The process of claim 1 wherein said at least 15% by weight of polymeric components have formula (1) and wherein X is

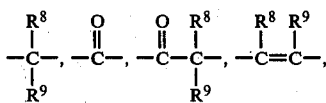

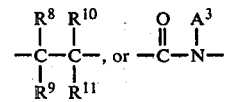

wherein $R^8$, $R^9$, $R^{10}$, and $R^{11}$ are independently hydrogen, alkyl group of 1 to 4 carbon atoms, cycloalkyl, group of 3 to 6 carbon atoms, and phenyl group of 6 to 12 carbon atoms, and
$A^3$ is an alkoxyalkyl group as defined for $A^1$ and $A^2$.

5. The process of claim 4 wherein $R^2$ is hydrogen.

6. The process of claim 4 wherein X is

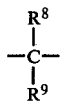

and $R^8$ and $R^9$ are hydrogen or alkyl of 1 to 4 carbon atoms.

7. The process of claim 6 wherein X is

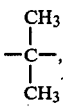

m is 2 to 5, R is $[+CH_2)_b]_m R^5+CH_2)_c$, E is

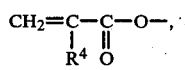

and $R^5$ is alkylene of 1 to 15 carbon atoms.

8. The process of claim 7 wherein $R^4$ is hydrogen.

9. The process of claim 1 wherein said components having the formula (1) or (2) comprise from 30 to 100% by weight of the radiation polymerizable components.

10. The process of claim 4 wherein 30 to 100% by weight of radiation polymerizable components comprise materials represented by formula (1).

11. A process for the curing of a composition comprising at least 15% by weight of radiation polymerizable components having the formula

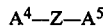

wherein $A^4$ and $A^5$ are independently groups of the formula

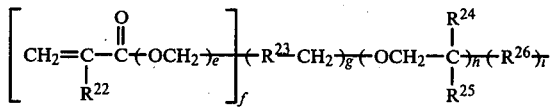

wherein
$R^{22}$ and $R^{25}$ are independently hydrogen or methyl,
$R^{23}$ is an aliphatic group of 1 to 15 carbon atoms,
$R^{24}$ is hydrogen or $-OR^{27}$ wherein
$R^{27}$ is hydrogen,

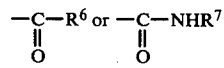

wherein
$R^6$ is an alkyl or alkenyl group and $R^7$ is selected from the group consisting of aliphatic and aromatic groups of up to eight carbon atoms,
$R^{26}$ is an alkylene group of from 1 to 6 carbon atoms,
e and g are independently 0 or 1,
f is an integer of from 1 to 5,
h is an integer of from 1 to 30,
i is 0 or 1, and
Z is a heterocyclic group of the formula

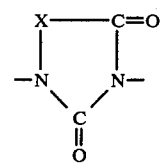

wherein X is a divalent group which is necessary to complete a 5- or 6-membered heterocyclic ring.

12. The process of claim 11 wherein x is

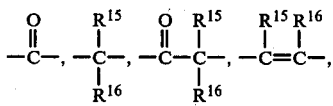

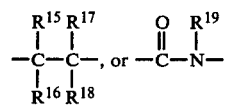

wherein $R^{15}$, $R^{16}$, $R^{17}$ and $R^{18}$ independently represent hydrogen, an alkyl group, an alkylene group, a cycloalkyl group, or a phenyl group, and
$R^{19}$ represents hydrogen, an aliphatic group, or an aromatic group.

13. The process of claim 1 wherein said composition contains at least 0.01% by weight of a polymerization initiator.

14. The process of claim 2 wherein said composition contains at least 0.01% by weight of a polymerization initiator.

15. The process of claim 4 wherein said composition contains at least 0.01% by weight of a polymerization initiator.

16. The process of claim 5 wherein said composition contains at least 0.01% by weight of a polymerization initiator.

17. The process of claim 6 wherein said composition contains at least 0.01% by weight of a polymerization initiator.

18. The process of claim 7 wherein said composition contains at least 0.01% by weight of a polymerization initiator.

19. The process of claim 9 wherein said composition contains at least 0.01% by weight of a polymerization initiator.

* * * * *